(12) United States Patent
Matalucci et al.

(10) Patent No.: US 12,135,143 B2
(45) Date of Patent: Nov. 5, 2024

(54) SYSTEM FOR HEATING AND COOLING SYSTEM WITH STAND-ALONE MODULAR UNITS

(71) Applicant: RENSSELAER POLYTECHNIC INSTITUTE, Troy, NY (US)

(72) Inventors: Berardo Matalucci, New York, NY (US); Theodorian Borca-Tasciuc, Troy, NY (US); Anna Helen Dyson, New York, NY (US); Benjamin Pearce, East Chatham, NY (US); Jason Oliver Vollen, South Orange, NJ (US)

(73) Assignee: Rensselaer Polytechnic Institute, Troy, NY (US)

( * ) Notice: Subject to any disclaimer, the term of this patent is extended or adjusted under 35 U.S.C. 154(b) by 743 days.

(21) Appl. No.: 16/185,487

(22) Filed: Nov. 9, 2018

(65) Prior Publication Data
US 2019/0137123 A1    May 9, 2019

Related U.S. Application Data

(60) Provisional application No. 62/757,928, filed on Nov. 9, 2018, provisional application No. 62/583,807, filed on Nov. 9, 2017.

(51) Int. Cl.
*F24F 5/00* (2006.01)
*F24F 110/10* (2018.01)
(Continued)

(52) U.S. Cl.
CPC .......... *F24F 5/0042* (2013.01); *F24F 5/0021* (2013.01); *F24F 2110/10* (2018.01); *F24F 2110/20* (2018.01); *F24F 2120/12* (2018.01)

(58) Field of Classification Search
CPC .... F24F 5/0021; F24F 5/0042; F24F 2110/10; F24F 2120/12; Y02E 60/14; F28D 20/021–028; B64G 1/427
See application file for complete search history.

(56) References Cited

U.S. PATENT DOCUMENTS 3,112,792 A    12/1963    Coleman, Jr. et al.
3,211,216 A    10/1965    Coleman, Jr. et al.
(Continued)

FOREIGN PATENT DOCUMENTS

CN    1761847 A    4/2006
JP    4610162 B2    1/2011
(Continued)

OTHER PUBLICATIONS

Deng, Q., et al., "Human thermal sensation and comfort in a non-uniform environment with personalized heating," Science of the Total Environment, vol. 578, pp. 242-248, 2017.
(Continued)

*Primary Examiner* — Frantz F Jules
*Assistant Examiner* — Webeshet Mengesha
(74) *Attorney, Agent, or Firm* — Barclay Damon LLC; Anthony P. Gangemi (57) ABSTRACT

One or more temperature control units are distributed throughout an environment to provide localized heating and cooling. The temperature control units include a thermal storage system including one or more substances of high latent heat capacity, a heat distribution surface, a solid-state heat pump positioned between the thermal storage system and the heat distribution surface, an environmental sensing module including a proximity sensor, and unit control modules in communication with the solid-state heat pumps. The solid-state heat pumps are individually controllable so that heating and cooling can be provided simultaneously from
(Continued)

separate heat pumps in the same temperature control unit, or separate temperature control units in the same environment. The system also senses the presence and location of an individual in the environment, and turns the distributed temperature control units on and off accordingly to provide optimum heating and cooling to the individual without heating or cooling the entire environment.

20 Claims, 8 Drawing Sheets

(51) Int. Cl.
*F24F 110/20* (2018.01)
*F24F 120/12* (2018.01)

(56) References Cited

U.S. PATENT DOCUMENTS

| | | | |
|---|---|---|---|
| 5,291,750 | A | 3/1994 | Parrish et al. |
| 5,499,504 | A | 3/1996 | Mill et al. |
| 5,722,482 | A | 3/1998 | Buckley |
| 6,004,662 | A | 12/1999 | Buckley |
| 6,464,672 | B1 | 10/2002 | Buckley |
| 6,481,213 | B2 | 11/2002 | Carr et al. |
| 6,551,347 | B1 | 4/2003 | Elkins |
| 7,152,412 | B2 | 12/2006 | Harvie |
| 8,342,454 | B1* | 1/2013 | Leimkuehler ............ B64G 1/50 244/159.1 |
| 2002/0043068 | A1* | 4/2002 | Carr .................. F25B 29/00 62/3.7 |
| 2004/0159109 | A1 | 8/2004 | Harvie |
| 2006/0293086 | A1* | 12/2006 | Haws ................ F28F 13/003 257/E23.089 |
| 2007/0084496 | A1 | 4/2007 | Edey |
| 2008/0141681 | A1 | 6/2008 | Arnold |
| 2008/0202516 | A1 | 8/2008 | Harvie |
| 2012/0061049 | A1 | 3/2012 | Micucci et al. |
| 2012/0152511 | A1* | 6/2012 | Chang ............... F28D 20/028 165/202 |
| 2013/0098068 | A1* | 4/2013 | Takahashi ............ F25B 21/02 62/3.2 |
| 2013/0325196 | A1 | 12/2013 | Basson et al. |
| 2014/0039691 | A1 | 2/2014 | Gupta et al. |
| 2015/0083180 | A1* | 3/2015 | Lang .................. H01L 35/30 136/207 |
| 2018/0281641 | A1* | 10/2018 | Durkee .............. B60N 2/5685 |

FOREIGN PATENT DOCUMENTS

| | | |
|---|---|---|
| JP | 5956444 B2 | 7/2016 |
| WO | 2008129357 A2 | 10/2008 |
| WO | 2017002105 A1 | 1/2017 |

OTHER PUBLICATIONS

Melin, S., "Urban Greening as part of District Energy Services," KTH Industrial Engineering and Management, Master of Science Thesis.

Pan, S., et al., "Intelligent furniture': the potential for heated armchairs to deliver thermal comfort with energy savings in the UK residential context," Windsor conference, Apr. 2018.

Lim, B.P., et al., "An Integrated Approach to Environmental Comfort with Low Energy," National University of Singapore.

Adhami, H., et al., "Thermodynamic feasibility study of a suggested portable personal micro trigeneration system based on micro-gas turbine and micro-absorption chiller," Applied Thermal Engineering, vol. 144, pp. 45-58, 2018.

He, Y., et al., "Using radiant cooling desk for maintaining comfort in hot environment," Energy and Buildings, vol. 145, pp. 144-154, 2017.

Kalaimani, R., et al., "On the Interaction between Personal Comfort Systems and Centralized HVAC Systems in office Buildings," arXiv, Oct. 2017.

Song, W., et al., "Hybrid cooling clothing to improve thermal comfort of office workers in a hot indoor environment," Building and Environment, vol. 100, pp. 92-101, 2016.

He, Y., et al., "Comfort, Energy Efficiency and Adoption of Personal Cooling Systems in Warm Environments: A Field Experimental Study," International Journal of Environmental Research and Public Health, vol. 14, 2017.

Gao, X., "Spot: A Smart Personalized Office Thermal Control System," Thesis presented to University of Waterloo, Waterloo, Ontario, Canada, 2013.

Gao, T., et al., "Three-Dimensional Printed Thermal Regulation Textiles," ACS Nano, vol. 11, pp. 11513-11520, 2017.

Wang, Q., "Developing a Data-Driven Model of Overall Thermal Sensation based on the Use of Human Physiological Information in a Built Environment," presented to Faculty of the School of Architecture University of California, Aug. 2017.

Zhivov, A., et al., "Energy Optimization Audit at Humphreys Engineer Center," US Army Corps of Engineers, Engineer Research and Development Center, Sep. 2008.

* cited by examiner

SYSTEM FOR HEATING AND COOLING SYSTEM WITH STAND-ALONE MODULAR UNITS

CROSS REFERENCE TO RELATED APPLICATION(S)

This application claims the benefit of U.S. Provisional Application No. 62/757,928 filed Nov. 9, 2018, and U.S. Provisional Application No. 62/583,807, filed Nov. 9, 2017, which are incorporated by reference as if disclosed herein in their entirety.

BACKGROUND

On national average, the building sector accounts for 40% of the end-use energy, in which space heating, cooling and ventilation represent about 50% and 40% of total energy consumed in the residential and commercial sectors respectively. The approach followed by conventional centralized heating, ventilation, and air conditioning (HVAC) technologies hinges on energy-intensive processes to pre-treat, dispatch and re-heat large air volumes to provide comfortable conditions to the building's occupants. However, distribution losses in centralized HVAC systems lower the overall Coefficient of Performance (COP) of the building system. While the state-of-the-art air-conditioning equipment might exhibit high individual COP, e.g., between 2.2 and 7, the overall COP of HVAC systems for commercial building types is more in the range of 0.99 to 2.50. Therefore, investing in highly efficient centralized equipment has critical limitations, due to the underlying losses that have detrimental effects on the energy performance of the whole building. In addition, climate-based performance, variable capacity performance, alternatives to refrigerants, and renewable energy integration are challenges that are yet to be resolved in conventional vapor compression technologies.

Personalized comfort systems, such as desk fans or heating and cooling chairs, are effective to fine-tune an individual's preferences, although they still require room conditioning to prevent excessive comfort asymmetries. Personal devices integrated into office furniture, in the form of auxiliary air system or personalized comfort chairs, often require integration with existing plenums or individual ducting, increasing the cost installation and maintenance. From the operational point of view, non-vapor compression technologies have the potential of making a greater contribution to energy reduction goals, limiting the use of refrigerants and gas emissions, and utilizing direct-current which facilitates microgrid integration.

SUMMARY

Some embodiments of the disclosed subject matter are directed to a system providing distributed heating and cooling to an environment including one or more temperature control units positioned within the environment, e.g., on at least one of a ceiling, a floor, a wall, an environmental partition, desk, table, seat, a light fixture, or combinations thereof, and configured to heat and cool an area of the environment localized around the unit. In some embodiments, the temperature control units include a thermal storage system including one or more substances of high latent heat capacity. In some embodiments, the temperature control units include an air distribution module positioned to assist convective heat transfer through the unit, a heat distribution surface including a first surface, a second surface, and one or more cavities in the first surface, second surface, or combinations thereof, the one or more cavities being positioned remote from the air distribution module. In some embodiments, the temperature control units include a solid-state heat pump positioned between the thermal storage system and the heat distribution surface. In some embodiments, the temperature control units include an environmental sensing module including a proximity sensor, a motion sensor, or combinations thereof. In some embodiments, the temperature control units include an unit control module in communication with the solid-state heat pumps of the temperature control units and configured to provide a first signal that increases an electric current through and heat transfer across the solid-state heat pump of a temperature control unit proximate an individual in the environment, and provide a second signal that modulates an electric current through and heat transfer across the solid-state heat pump of a temperature control unit remote from the individual.

Some embodiments of the present disclosure include a method for heating and cooling an environment. In some embodiments, the method includes distributing one or more temperature control units throughout the environment. In some embodiments, the method includes providing a first signal that increases an electric current through and heat transfer across the solid-state heat pump to the solid-state heat pump of a temperature control unit proximate an individual in the environment. In some embodiments, the method includes providing heat from the solid-state heat pump to one of the thermal storage system and the heat distribution surface in response to the first signal. In some embodiments, the method includes providing a second signal that reduces an electric current through and heat transfer across the solid-state heat pump to the solid-state heat pump of a temperature control unit remote from the individual.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
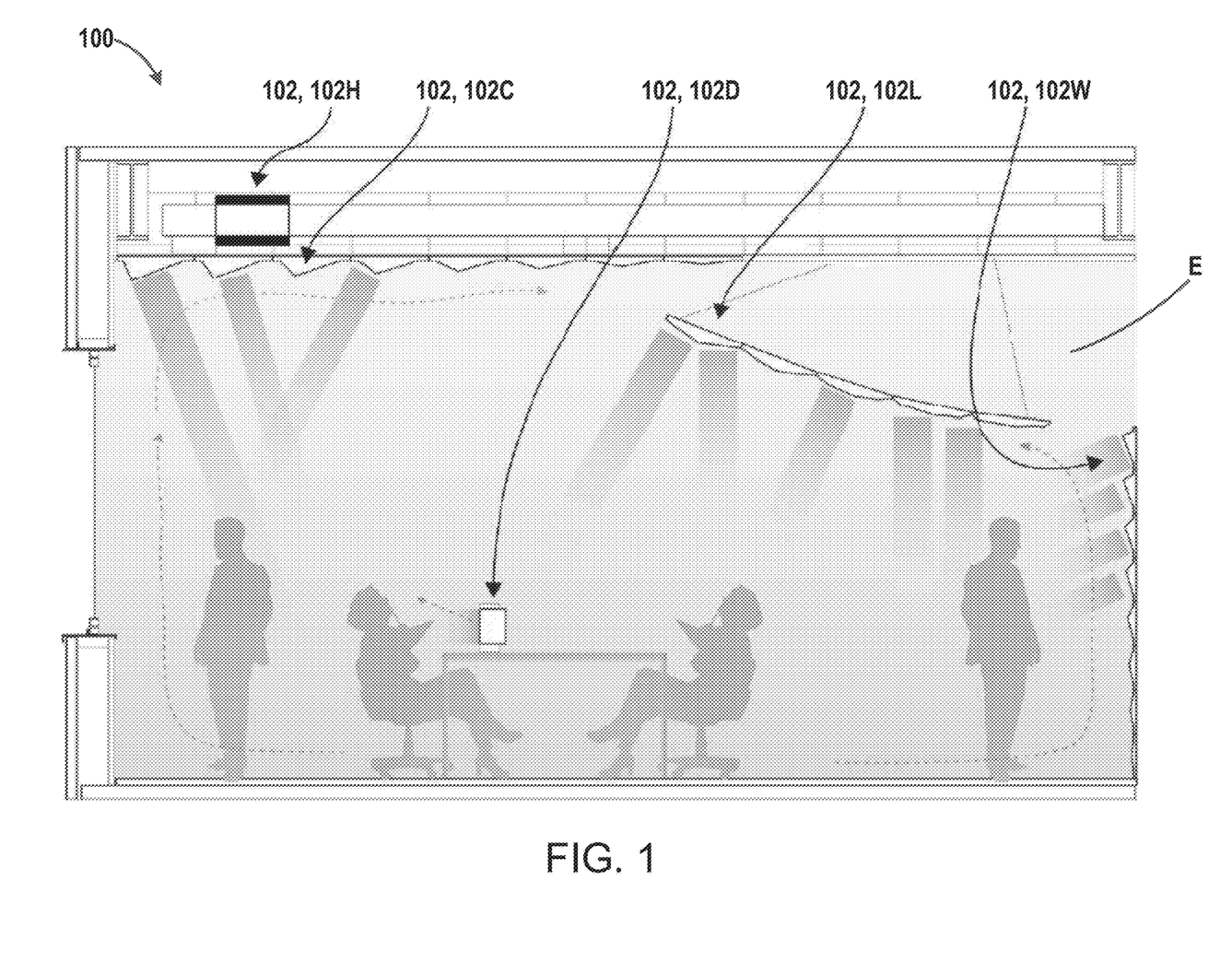
FIG. 1 is a schematic representation of a heating and cooling system according to some embodiments of the present disclosure.

Referring now to FIG. 1, aspects of the disclosed subject matter include a system 100 providing distributed heating and cooling to an environment, such as interior E. System 100 includes one or more temperature control units 102 positioned within the environment to heat and cool an area of the environment localized around unit 102, to heat or cool individuals within the environment, or combinations thereof. In some embodiments, temperature control units 102 are distributed throughout the environment. In some embodiments, temperature control units 102 are portable and can be moved about to locations in the environment where they are most needed, e.g., where an individual is located. The examples shown in FIG. 1 include temperature control units 102 positioned on a ceiling 102C, a wall 102W, a desk 102D, a light fixture 102L, and other HVAC components 102H, however the present disclosure is not limited in this regard, as the temperature control units 102 can also be mounted on a floor, an environmental partition, a table, a seat, or combinations thereof. In some embodiments, system 100 includes at least two or more temperature control units 102 within the environment. In some embodiments, a plurality of temperature control units 102 are provided in an array. System 100 and its components can be any suitable size for heating or cooling a desired area of the environment localized around unit 102 or a target individual.

Figure 2:
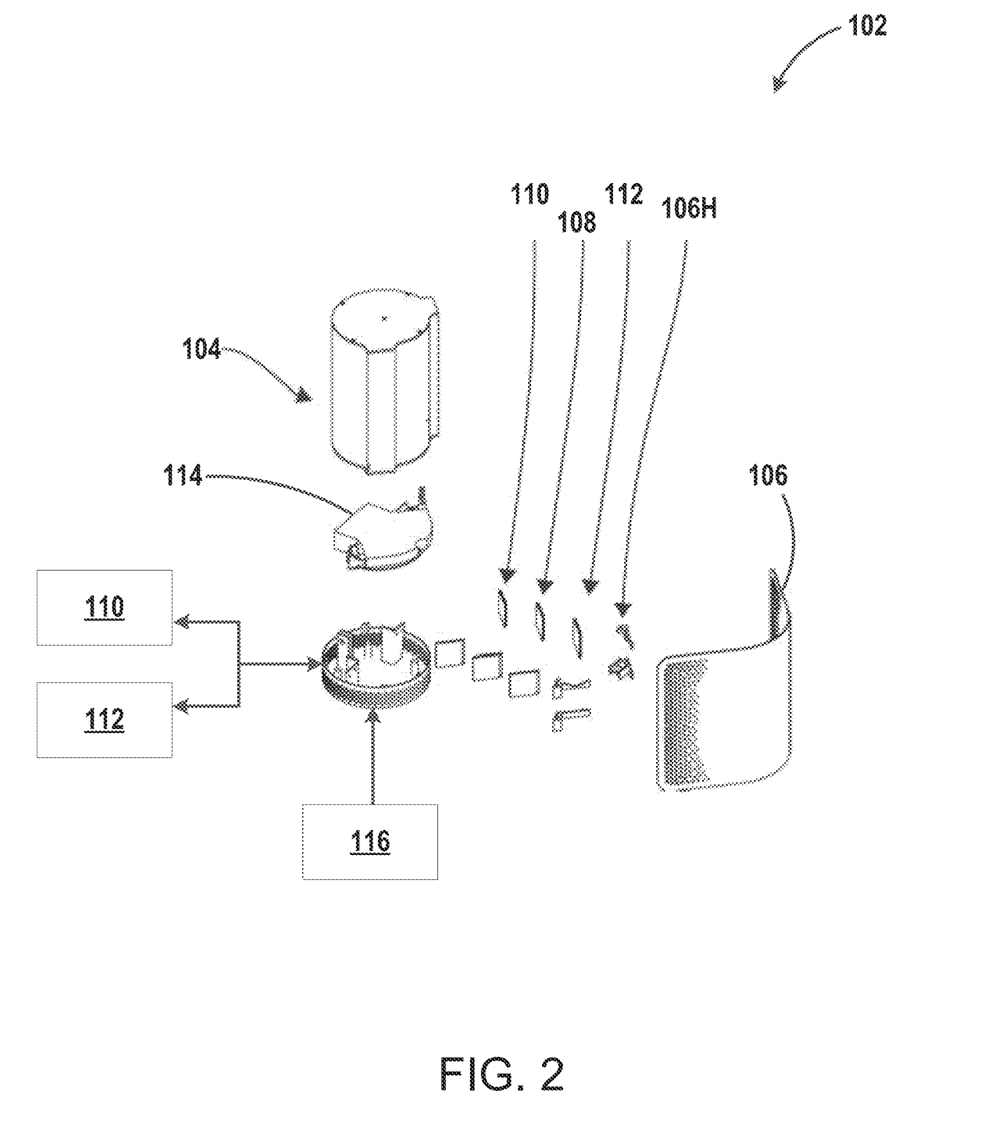
FIG. 2 is a schematic representation of a temperature control unit according to some embodiments of the present disclosure.

Referring now to FIG. 2, in some embodiments, temperature control units 102 include one or more thermal storage systems 104. The thermal storage systems 104 include one or more substances of high thermal storage capacity. In some embodiments, the one or more substances of high thermal storage capacity are liquid, solid, or a combination thereof, at ambient temperature. In some embodiments, thermal storage systems 104 include one or more substances of high latent heat capacity. The thermal storage system 104 serves the function of storing heat in the form of latent and/or sensible heat. In some embodiments, the one or more substances have a latent heat capacity of at least about 100, at least about 110, at least about 120, at least about 130, at least about 140, at least about 150, at least about 160, at least about 170, at least about 180, at least about 190, at least about 200, at least about 210, or at least about 220 J/g at a phase transition temperature. In some embodiments, the one or more substances of high latent heat capacity have a solid to liquid phase change between about 10° C. and about 34° C. In some embodiments, the one or more substances of high latent heat capacity have a liquid to gas phase change between about 10° C. and about 34° C. In some embodiments, the one or more substances of high thermal storage capacity include organic phase change materials, inorganic phase change materials, microencapsulated phase change materials, or combinations thereof.

Figure 3:
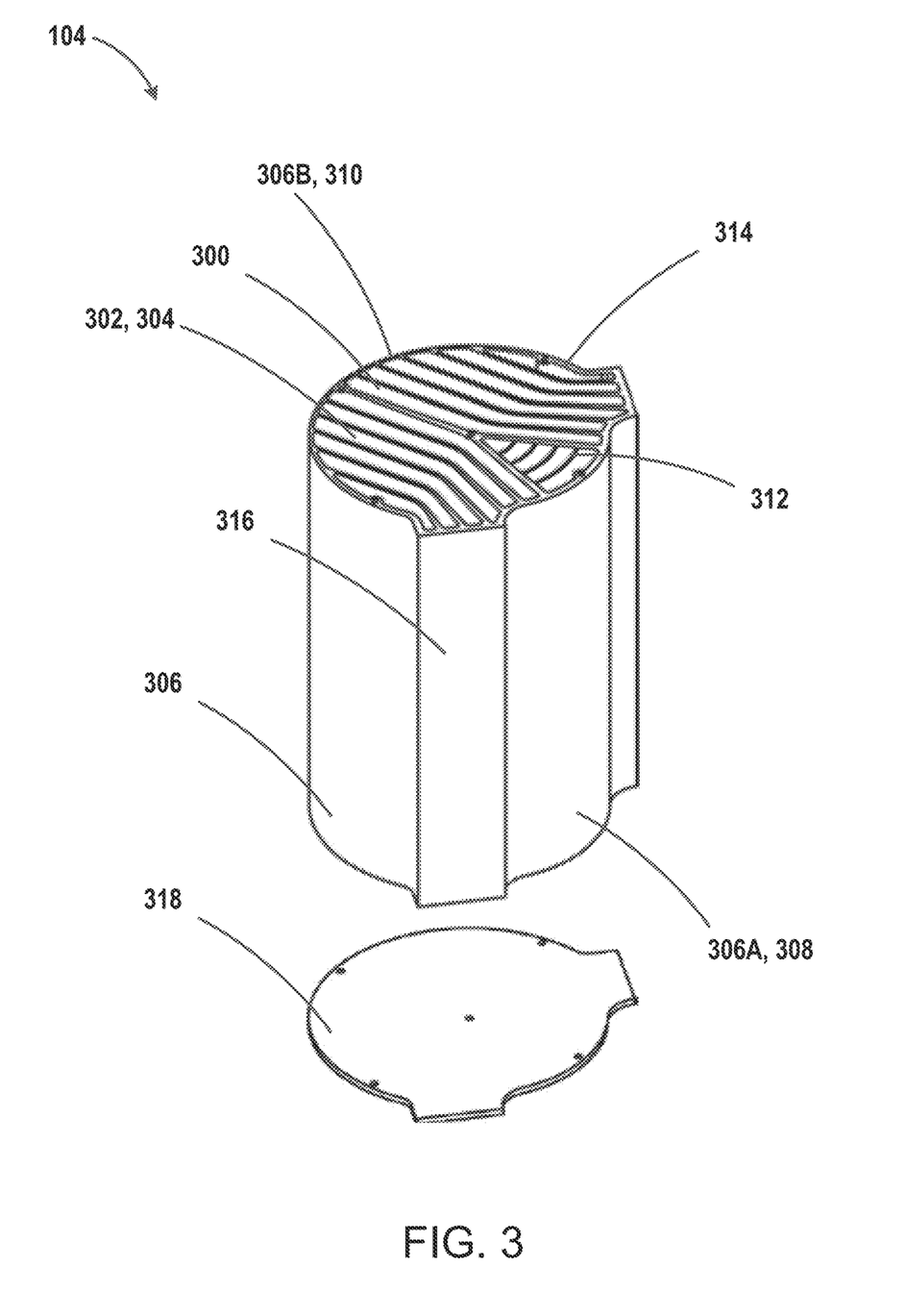
FIG. 3 is a schematic representation of a thermal storage system according to some embodiments of the present disclosure.

Referring now to FIG. 3, in some embodiments, thermal storage systems 104 include a scaffolding structure 300 that directs and distributes heat substantially uniformly throughout the storage system. In some embodiments, the scaffolding structure 300 is composed of a high thermal conductivity material, i.e., greater than 100 W/mK, with a polymeric coating for chemical protection. In some embodiments, scaffolding structure 300 is composed of aluminum, copper, steel, stainless steel, polymeric composite polymeric with high-thermally conductive fibers, e.g., graphene fibers, or combinations thereof. In some embodiments, scaffolding structure 300 includes one or more hollow regions 302 that include the one or more substances of high thermal storage capacity 304. In some embodiments, scaffolding structure 300 includes an outer shell 306 having a first thickness 306A at a surface 308 adjacent a heat pump and a second thickness 306B at a surface 310 opposite the heat pump (as will be discussed in greater detail below). In some embodiments, first thickness 306A is greater than second thickness 306B. In some embodiments, thermal storage system 104 includes a structural support profile 312. Structural support profile 308 provides structural stability to thermal storage system 104. In some embodiments, scaffolding structure 300 is a one-piece body 314 including one or more of hollow regions 302 to allow for substantially uniform thermal diffusion. In some embodiments, the direction of hollow regions 302 is a combination of radial and linear. In some embodiments, thermal storage system 104 includes one or more protrusions 316. As shown herein, thermal storage system 104 are portrayed as generally cylindrical, however the present disclosure is not limited in this regard, as the overall shape of thermal storage system 104 can be any suitable shape so long as it is effective to store or provide heat to the heat pump, as will be discussed in greater detail below.

Still referring to FIG. 3, in some embodiments, scaffolding structure 300 is capped (e.g., at a top, bottom, side, or combinations thereof) by one or more enclosing parts 318, e.g., to provide an air and liquid seal. In some embodiments, enclosing parts 318 are composed of aluminum, copper, steel, stainless steel, polymeric composite polymeric with high-thermally conductive fibers, e.g., graphene, Nylon, Viton, PETE, PVDF, other materials chemically resistant to acids, or combinations thereof.

Figure 4A:
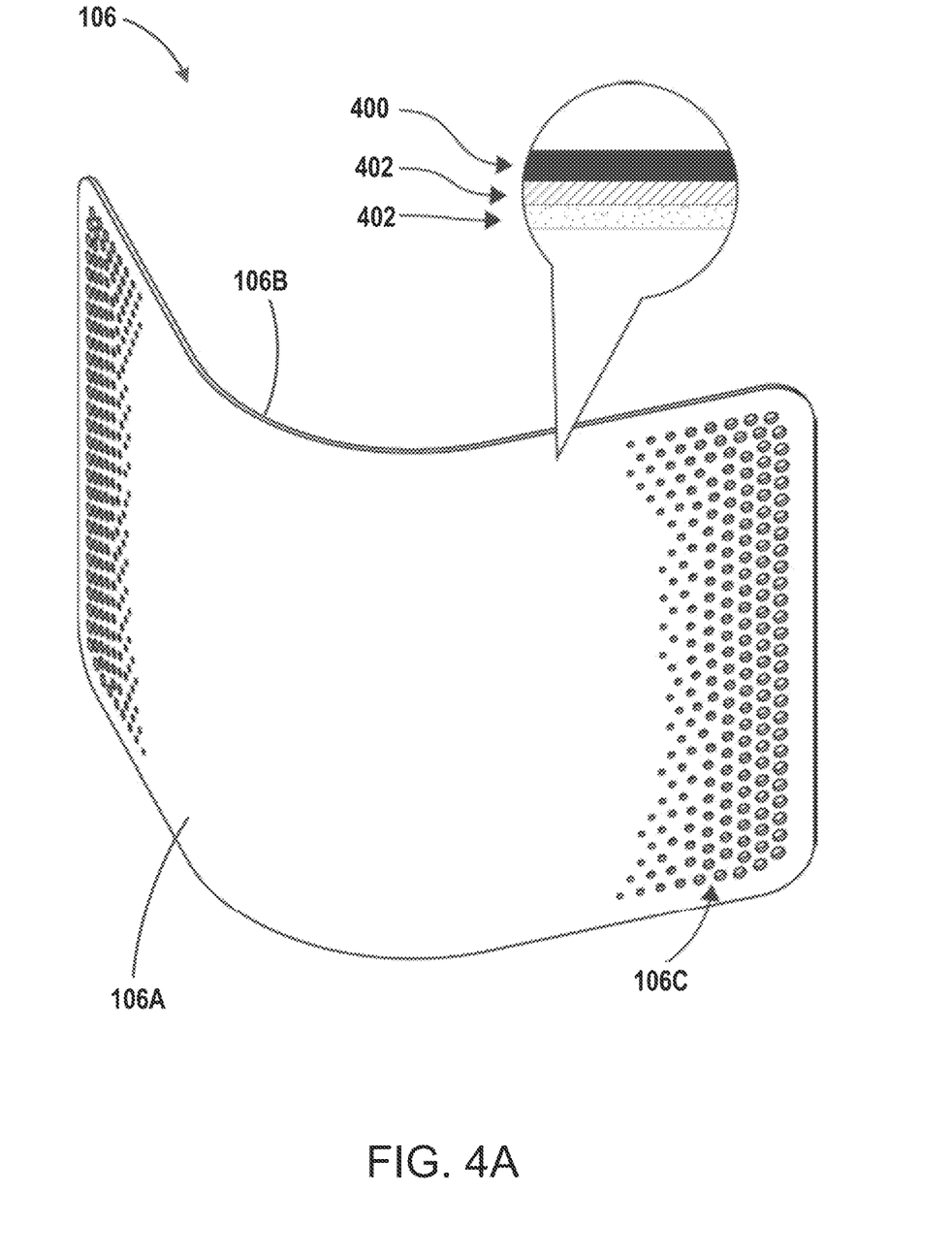
FIG. 4A is a schematic representation of a heat distribution surface according to some embodiments of the present disclosure.

Referring now to FIGS. 2 and 4A, in some embodiments, temperature control units 102 include one or more heat distribution surfaces 106. In some embodiments, heat distribution surfaces 106 includes a first surface 106A, a second surface 106B, and one or more cavities 106C. In some embodiments, the cavities 106C are positioned generally evenly across the heat distribution surface 106. In some embodiments, cavities 106C are concentrated towards one or more edges of heat distribution surface 106. In some embodiments, cavities 106C are concentrated towards a center of heat distribution surface 106. In some embodiments, heat distribution surface 106 includes one or more hollow spaces extending between and parallel to the first surface 106A and the second surface 106B. In some embodiments, the overall thickness of heat distribution surfaces 106 is less than about 20 mm, less than about 15 mm, or less than about 10 mm.

Without wishing to be bound by theory, heat distribution surface 106 distributes heat from temperature control unit 102 over its surface area, thus increasing the heat transfer between unit 102 and the environment localized around unit 102. In some embodiments, heat distribution surface 106 is attached to a holding component 106H that provides mechanical connection and stability between heat distribution surface 106 and other components of temperature control unit 102.

In some embodiments, heat distribution surface 106 is composed of aluminum, copper, steel, stainless steel, ceramic, polymeric materials with high-thermal conductivity additives that develop an overall thermal conductivity of 100 W/mK or greater, or combinations thereof. While the drawings of the present disclosure portray heat distribution surface 106 as being generally L-shaped, the present disclosure is not limited in this regard, as heat distribution surface 106 can also be planar, circular, or any other suitable shape. In some embodiments, heat distribution surface 106 is composed of one or more layers 400. In some embodiments heat distribution surface 106 includes one or more surface layers 402. In some embodiments, surface layer 402 includes a high emissivity coating, a polymer coating, metal anodizing, surface abrasion, sorbent coating, or combinations thereof. In some embodiments, surface layers 402 are provided on first surface 106A, second surface 106B, or combinations thereof. In some embodiments, surface layers 402 have a non-uniform texture for increasing heat transfer, acoustic dispersion, and aesthetic value. In some embodiments, the surface area of heat distribution surface 106 is proportional to the heating and cooling capacity and the distance of users from the device.

Referring again to FIG. 2, in some embodiments, temperature control unit 102 include one or more solid-state heat pumps 108. In some embodiments, solid-state heat pump 108 does not have any moving part, e.g., thermoelectric heat pumps. Without wishing to be bound by theory, using thermoelectric heat pumps reduces by at least an order of magnitude the energy required to run system 100, and operate with proportional DC current relative to the necessary heating and cooling capacity. In some embodiments, solid-state heat pumps 108 employ inorganic (i.e., BiTe, BiSe, SbTe, PbTe, MgSi or other bulk materials) and/or organic (i.e. SiGe, NaCo and other) materials, and can be of any suitable configuration, such as multi-stage thermoelectric devices, thin films, or other spatial embodiments. In some embodiments, solid-state heat pumps 108 is a single-stage thermoelectric energy generator. In some embodiments, system 100 includes additional heat pump mechanisms including air source heat pumps, water source heat pumps, ground source heat pumps, absorption heat pumps, adsorption heat pumps, ductless mini split heat pumps, miniaturized vapor compression, magnetocaloric heat pumps, thermotunneling heat pumps, Brayton cycle heat pumps, thermoacoustic heat pumps, thermoelestic heat pumps, Vuilleumier heat pumps, Bernoulli heat pumps, electrocaloric heat pumps, membrane heat pumps, or combinations thereof.

In some embodiments, solid-state heat pump 108 is positioned between thermal storage system 104 and heat distribution surface 106. Solid-state heat pump 108 is positioned and configured to generate heat for absorption into each of thermal storage system 104 and heat distribution surface 106 as needed. In some embodiments, solid-state heat pump 108 is in direct contact with thermal storage system 104 and heat distribution surface 106. In some embodiments, solid-state heat pump 108 is in direct contact with protrusions 316 on thermal storage system 104. In some embodiments, one or more thermally conductive spacers 110 or 112 are positioned between solid-state heat pump 108 and thermal storage system 104 and/or heat distribution surface 106. In some embodiments, the thermally conductive spacers include a layer of thermally conductive paste. Solid-state heat pump 108 provides switchable heating and cooling using electric current. In response to the application of electric current through solid-state heat pump 108, heat is moved from one side of the heat pump to the other. Thus, by positioning solid-state heat pump 108 between thermal storage system 104 and heat distribution surface 106, heat pump 108 is generating heat at surface 106 (and providing cooling to storage system 104) or providing heat to storage system 104 (and providing cooling at surface 106). Single or multiple solid-state heat pumps 108 can be individually or collectively controlled within the same temperature control unit 102. By way of example, one or more solid-state heat pumps 108 of a given temperature control unit 102 can provide heat while one or more solid-state heat pumps 108 can simultaneously provide cooling, e.g., in different orientations.

Figure 4B:
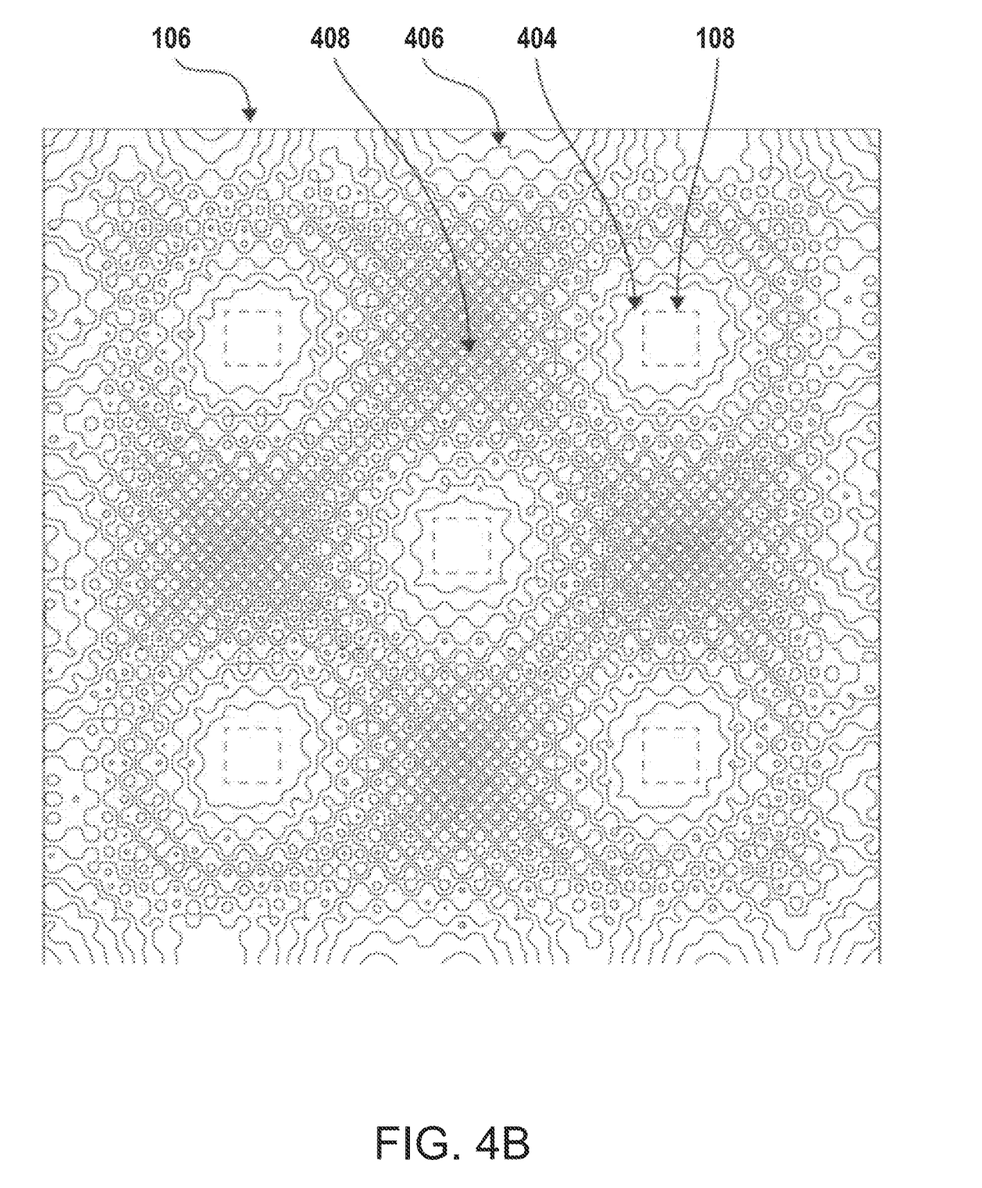
FIG. 4B is a schematic representation of a heat distribution surface according to some embodiments of the present disclosure.

Referring now to FIG. 4B, in some embodiments, there is planar contact 404 between solid-state heat pump 108 and heat distribution surface 106. Without wishing to be bound by theory, the planar contact 404 maximizes conduction heat transfer between solid-state heat pump 108 and heat distribution surface 106. In some embodiments, with increasing distance from the center of solid-state heat pump 108, depressions and/or bumps on heat distribution surface 106 are alternated as a topographic contour 406, e.g., checkerboard pattern 408, with progressive amplitude.

Referring again to FIG. 2, system 100 includes an environmental sensing module 110. In some embodiments, environmental sensing module 110 includes a proximity sensor, a motion sensor, an environmental temperature sensor, environmental humidity sensor, or combinations thereof. In some embodiments, environmental sensing module 110 further includes biometric sensors, environmental sensors, specific-user identification sensors, etc., for monitoring the status of one or more individuals in the environment localized around a temperature control unit 102. Environmental sensing module 110 is positioned and configured to sense characteristics of the environment localized around temperature control unit 102, thus determining how unit 102 should be controlled to provide optimal heating or cooling to the individuals in the environment. By way of example, environmental sensing module 110 including at least one proximity or motion sensor registers the presence of an individual near temperature control unit 102, and thus can turn the unit on when the individual is in the environment localized around temperature control unit 102 and off when the individual is remote from the environment localized around temperature control unit 102. In some embodiments, the environmental sensing module 110 includes a communication module to communication wirelessly, e.g., via Bluetooth, Wi-Fi, near-field communication, RFID, etc., with one or more receivers.

Still referring to FIG. 2, system 100 includes one or more unit control modules 112 in communication with solid-state heat pumps 108. In some embodiments, unit control modules 112 provide a first signal that increases an electric current through and heat transfer across solid-state heat pump 108. In some embodiments, unit control modules 112 provide a second signal that decreases an electric current through and heat transfer across solid-state heat pump 108. In some embodiments, unit control module 112 is in communication, e.g., wired or wireless communication, with environmental sensing module 110. In some embodiments, the signals provided by unit control module are continuous, pulsed, or combinations thereof.

Figure 5:
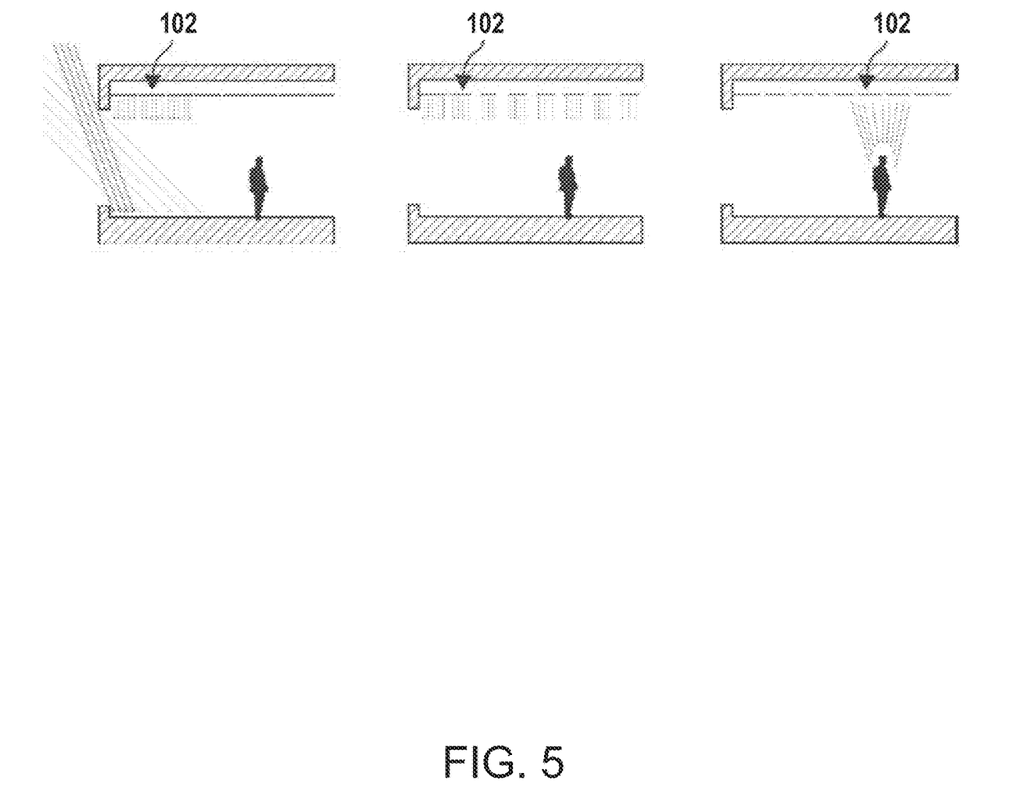
FIG. 5 is a schematic representation showing control of a heating and cooling system according to some embodiments of the present disclosure.

Thus, in some embodiments, and referring now to FIG. 5, temperature control units 102 are individually controlled and capable of providing different comfort profiles and fulfilling the needs of individuals with different preferences or facilitating heterogeneous environmental conditions. In these embodiments, system 100 can use data provided by environmental sensing module 110 to determine whether the addition or subtraction of heating or cooling to an environment localized around temperature control unit 102 is necessary to optimize temperature conditions there, and adjust the heating or cooling of individual temperature control units 102 on a case-by-case solid-state heat pump 108 basis via unit control modules 112. In some embodiments, temperature control units 102 are actuated based on the presence of an individual in an environment, the proximity of an individual to temperature control unit 102, a change in the presence and/or proximity of an individual to temperature control unit 102, predetermined temperature preferences for an individual, or combinations thereof. In some embodiments, system 100 acts to maintain a substantially constant temperature in an environment. In some embodiments, system 100 actuates individual temperature control units 102 to maintain a desired temperature gradient within an environment. In some embodiments, system 100 actuates individual temperature control units 102 to maintain heating or cooling that "follows" individuals as they move about an environment. In some embodiments, temperature control units 102 are actuated automatically. In some embodiments, temperature control units 102 are actuated based on machine learning algorithms, biometric inputs, e.g., from heart rate sensors, EEG sensors, etc., predetermined user preferences, or combinations thereof.

Referring again to FIG. 2, in some embodiments, temperature control unit 102 includes an air distribution module 114. Air distribution module 114 is positioned and configured to assist convective heat transfer through temperature control unit 102 by forcing air flow between heat distribution surface 106 and the area of the environment localized around unit 102. In some embodiments, air distribution module 114 includes fans, blowers, centrifugal blowers, micro air blowers, piezoelectric fan blowers, other devices that displace air, or combinations thereof. In some embodiments, the air-stream volume from air distribution module 114 diffusing heat in the space should be proportional to the heating and cooling capacity and the distance of users from unit 102. In some embodiments, air distribution module 114 is thermally insulated from thermal storage system 104 to avoid thermal exchange between air and system 104.

In some embodiments, forced air from air distribution module 114 is directed through cavities 106C, one or more hollow spaces extending between and parallel to the first surface 106A and the second surface 106B of heat distribution surface 106, or combinations thereof. In some embodiments, cavities 106C are positioned remote from air distribution module 114. In some embodiments, centers of the solid-state heat pump 108 and air distribution module 114 are equally distant from the center of heat distribution surface 106.

In some embodiments, system 100 includes a power source 116. Power source 116 is configured to provide operating power to temperature control units 102 to facilitate the methods and uses described herein. In some embodiments, power source 116 includes a rechargeable battery, power cord, or combinations thereof. In some embodiments, excess heat stored in thermal storage system 104 is used to create a temperature gradient across solid-state heat pump 108 when the pump is not in use, that temperature gradient resulting the generation of additional electrical energy, e.g., as a thermoelectric generator.

Figure 6:
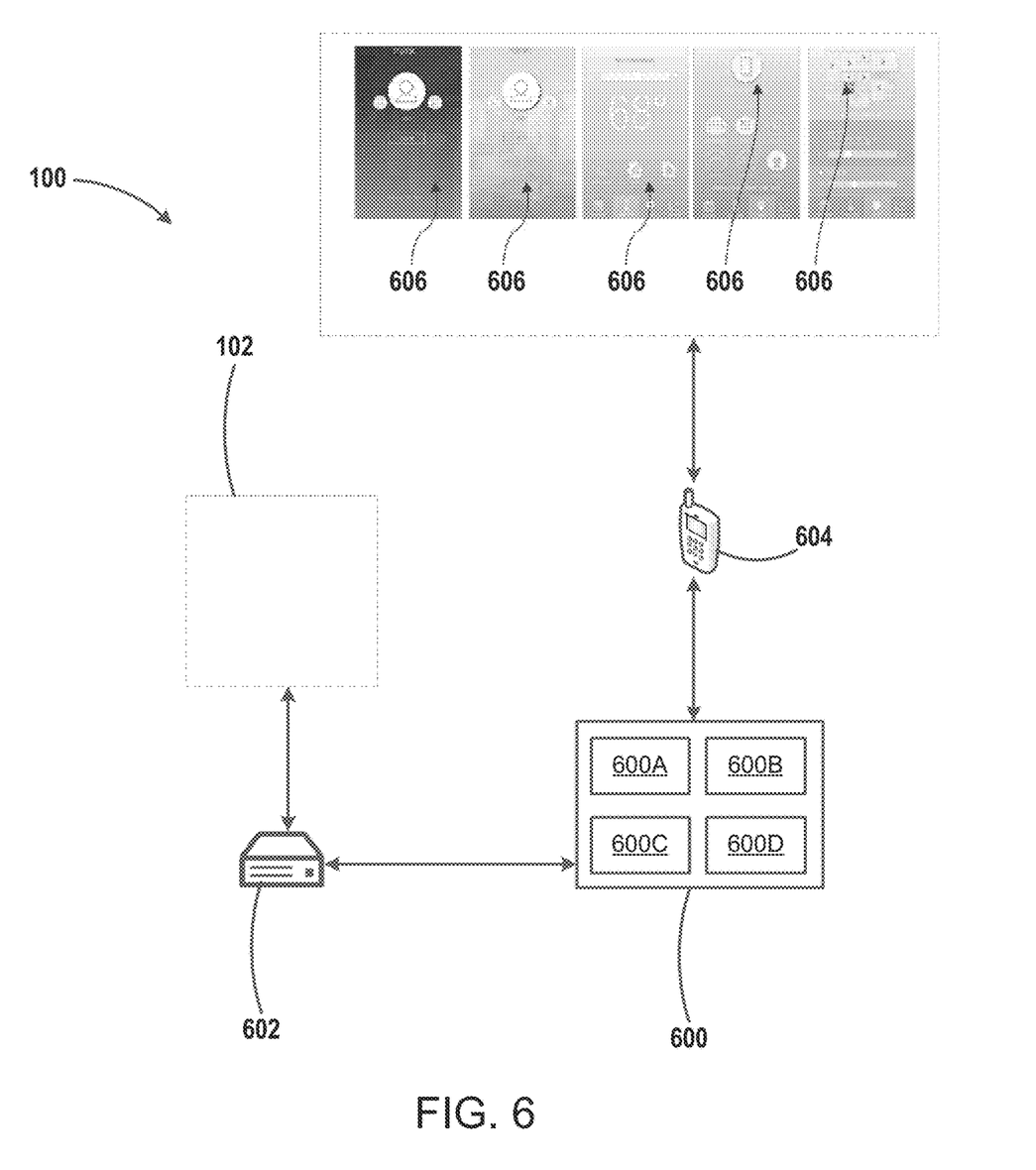
FIG. 6 is a schematic representation showing control of a heating and cooling system according to some embodiments of the present disclosure.

Referring now to FIG. 6, in some embodiments, system 100 includes one or more software applications 600, e.g., 600A-600D, executing on a computer readable medium 602. In some embodiments, computer readable medium 602 is included in a computer device, e.g., a desktop, laptop, tablet, smartphone, PDA, etc. In some embodiments, software application 600 is stored and executed remotely, e.g., on a remote server, but are executable or controllable via a user's computer device 604. In some embodiments, software application 600 is a mobile application. In some embodiments, software application 600 is hosted on a website. Software application 600 provides an individual with control over system 100 and thus temperature control units 102 and the heating and cooling of an environment as described herein. In some embodiments, software application 600 controls individual temperature control units 102. In some embodiments, software application controls two or more temperature control units 102 as a group. In some embodiments, software application records and implements heating and cooling preferences for a certain individual. In some embodiments, software application controls air temperature set-points for the environment, individual temperature control units 102, two or more temperature control units 102 as a group, etc. In some embodiments, software application 600 records environmental data and system performance over time, e.g., within one or more databases, servers, etc. In some embodiments, software application 600 includes an interactive graphical user interface 606 enabling the user to interact with the various features of the application.

Figure 7:
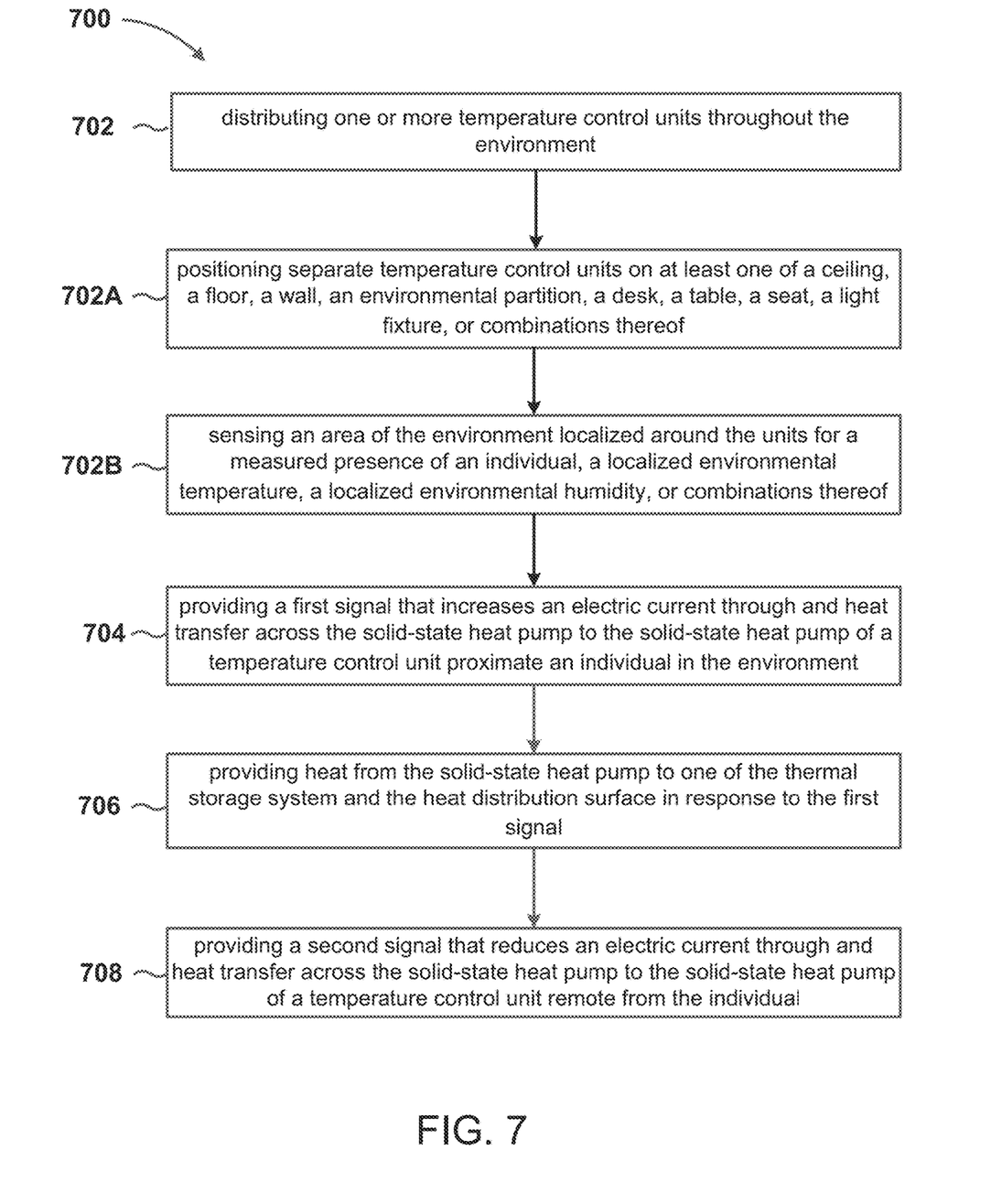
FIG. 7 is a chart of a method for localized heating and cooling according to some embodiments of the present disclosure.

Referring now to FIG. 7, in some embodiments, the present disclosure is directed to a method 700 for heating and cooling an environment. At 702, one or more temperature control units are distributed throughout the environment. As discussed above, in some embodiments, the units are configured to heat and cool an area of the environment localized around the unit and include a thermal storage system including one or more substances of high thermal storage capacity, a heat distribution surface, and at least one solid-state heat pump positioned between the thermal storage system and the heat distribution surface. In some embodiments, at 702A, separate temperature control units are positioned on at least one of a ceiling, a floor, a wall, an environmental partition, a desk, a table, a seat, a light fixture, or combinations thereof. In some embodiments, at 702B, an area of the environment localized around the units is monitored for a presence and/or motion of an individual, a localized environmental temperature, a localized environmental humidity, or combinations thereof. At 704, a first signal is provided that increases an electric current through and heat transfer across the solid-state heat pump to the solid-state heat pump of a temperature control unit proximate an individual in the environment. At 706, heat is provided from the solid-state heat pump to one of the thermal storage system and the heat distribution surface in response to the first signal. In some embodiments, at 708, a second signal is provided that modulates, e.g., reduces, an electric current through and heat transfer across the solid-state heat pump to the solid-state heat pump of a temperature control unit remote from the individual.

Methods and systems of the present disclosure advantageously provide localized comfort via distributed modular units for heating and cooling. By distributing the heating and cooling modules within an occupied space, several advantages are obtained compared to the centralized space heating and cooling system. The modular units can be operated without outside venting unlike space heating and cooling equipment. Additionally, by locating and distributing the modules within an occupied space, more even and controllable thermal conditions, i.e., temperature profiles, can be achieved allowing for personalizing the comfort for multiple users in a space. The sources of heating and cooling can be multiple and chosen within a space, unlike few entry inlets of centralized space heating and cooling system driven primarily by engineering needs of optimization of ductwork or limited to building envelope. Reduction in air-volume given by localized heating and cooling provided by the distributed units translates in smaller ducts and reduce interstitial technical space. Thus, thermal comfort preferences can be adjusted with greater refinement and need not be limited to one controlling device in a space. Without the need to extensive ducting, a higher floor-to-ceiling height can be achieved. Further, heating and cooling modules can also be distributed inside an occupied space and near occupants, reducing the need to conditioning an entire volume. Significant energy savings can result because air temperature set-points can be relaxed from energy intensive values. Without wishing to be bound by theory, using thermoelectric heat pumps reduces by at least an order of magnitude the energy required to run the system, operating with proportional DC current relative to the necessary heating and cooling capacity, thereby compounding environmental benefits with energy savings for the user. Finally, the use of a sorbent layer on the heat distribution surface, combined with the solid-state heat pump's ability to quickly change the surface temperature, greatly reduces the likelihood of condensation build-up within the system.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A system for providing distributed heating and cooling, comprising:
    one or more temperature control units, each temperature control unit among the one or more temperature control units being configured to heat and cool an area of an environment to be thermally regulated, the area being localized around the respective temperature control unit, each temperature control unit including:
        a thermal storage system comprising:
            a cylindrical shell having a first axial end and a second axial end as measured along a longitudinal axis of the cylindrical shell, and a length measured from the first axial end to the second axial end along the longitudinal axis, the cylindrical shell is elongated along the longitudinal axis;
            a plurality of protrusions on the cylindrical shell, each of the plurality of protrusions fully extends along the length of the cylindrical shell from the first axial end to the second axial end parallel to the longitudinal axis;
            a scaffolding structure within the cylindrical shell, the scaffolding structure forming a plurality of hollow regions; and
            one or more substances for storing thermal energy housed within each of the plurality of hollow regions;
            wherein the scaffolding structure and the cylindrical shell are integrally formed as a one-piece construction;
        a heat distribution surface comprising a first surface, a second surface opposing the first surface, and a plurality of cavities passing entirely through the heat distribution surface from the first surface to the second surface, the heat distribution surface is substantially L-shaped;
        a solid-state heat pump positioned between the thermal storage system and the heat distribution surface and configured to generate heat for absorption into the thermal storage system and the heat distribution surface; and
        an air distribution module configured to force air flow between the heat distribution surface and the area; and
    one or more controllers in communication with the solid-state heat pump and configured to provide a signal to the solid-state heat pump that controls an electric current through and heat transfer across the solid-state heat pump.

2. The system according to claim 1, wherein the one or more substances for storing thermal energy comprises one or more substances of high latent heat capacity.

3. The system according to claim 1, wherein the signal is continuous, pulsed, or combinations thereof.

4. The system according to claim 1, wherein the solid-state heat pump is in direct contact with the thermal storage system, the heat distribution surface, or combinations thereof.

5. The system according to claim 1, wherein the solid-state heat pump is in direct contact with the one or more protrusions of the thermal storage system.

6. The system according to claim 1, wherein the air distribution module is positioned to assist convective heat transfer through the temperature control unit and includes one or more fans, blowers, centrifugal blowers, piezoelectric fan blowers, or combinations thereof.

7. The system according to claim 6, wherein the heat distribution surface is positioned such that the plurality of cavities are positioned remote from the air distribution module.

8. The system according to claim 1, wherein the heat distribution surface includes one or more hollow spaces extending between and parallel to the first surface and the second surface.

9. The system according to claim 2, wherein the one or more substances of high latent heat capacity have a latent heat of at least about 150 J/g at a phase transition temperature.

10. The system according to claim 2, wherein the one or more substances of high latent heat capacity have a solid to liquid phase change between about 10° C. and about 34° C.

11. The system according to claim 2, wherein the one or more substances of high latent heat capacity include organic phase change materials, inorganic phase change materials, microencapsulated phase change materials, or combinations thereof.

12. The system according to claim 1, wherein the cylindrical shell has a first thickness at a first surface adjacent to the solid-state heat pump and a second thickness at a second surface opposite the solid-state heat pump, the first thickness being greater than the second thickness.

13. The system according to claim 1, wherein the heat distribution surface includes a surface layer, the surface layer including a polymer coating, metal anodizing, surface abrasion, sorbent coating, or combinations thereof.

14. The system according to claim 1, further comprising a power source including a rechargeable battery, power cord, or combinations thereof.

15. The system according to claim 1, wherein each temperature control unit further comprises an environmental sensing module including at least one proximity sensor to turn the temperature control unit on and off based on detected presence of an individual proximate the respective temperature control unit, an environmental temperature sensor, environmental humidity sensor, or combinations thereof.

16. The system according to claim 1, wherein the one or more temperature control units are configured to be distributed throughout the environment.

17. The system according to claim 1, wherein the thermal storage system further comprises an enclosing part secured to the second axial end of the cylindrical shell to seal the second axial end.

18. The system according to claim 1, wherein the plurality of cavities of the heat distribution surface are arranged in a gradient pattern on the heat distribution surface such that a concentration of the plurality of cavities is greatest along one or more edges of the heat distribution surface.

19. The system according to claim 17, wherein the thermal storage system further comprises a structural profile component disposed between the protrusions.

20. The system according to claim 19, wherein the structural support profile has a variable thickness as measured along a radial line of the cylindrical shell.

* * * * *